(12) United States Patent
Wagner et al.

(10) Patent No.: US 8,087,704 B2
(45) Date of Patent: Jan. 3, 2012

(54) LATCH FOR AIRCRAFT OVEN

(75) Inventors: Stefan Wagner, Homberg (DE); Walter Derenek, Herborn (DE)

(73) Assignee: SELL GmbH, Herborn (DE)

(*) Notice: Subject to any disclaimer, the term of this patent is extended or adjusted under 35 U.S.C. 154(b) by 675 days.

(21) Appl. No.: 12/099,891

(22) Filed: Apr. 9, 2008

(65) Prior Publication Data
US 2008/0258477 A1    Oct. 23, 2008

(30) Foreign Application Priority Data

Apr. 17, 2007   (DE) .......................... 10 2007 018 011

(51) Int. Cl.
*E05C 19/18*   (2006.01)

(52) U.S. Cl. ................. 292/288; 292/DIG. 11; 292/33

(58) Field of Classification Search ............. 292/32, 292/57, 59, 64, 33, 37, 38, 42, DIG. 11, DIG. 20
See application file for complete search history.

(56) References Cited

U.S. PATENT DOCUMENTS

| | | | | |
|---|---|---|---|---|
| 3,333,878 A * | 8/1967 | Pelcin | ............... | 292/37 |
| 5,911,763 A * | 6/1999 | Quesada | ............ | 70/120 |
| 6,902,063 B2 * | 6/2005 | Pai et al. | ........... | 206/710 |
| 7,549,552 B2 * | 6/2009 | Hasegawa et al. | ........... | 220/323 |
| 2003/0132232 A1 * | 7/2003 | Eggum | ............ | 220/323 |

* cited by examiner

*Primary Examiner* — Carlos Lugo
*Assistant Examiner* — Mark Williams
(74) *Attorney, Agent, or Firm* — Andrew Wilford

(57) ABSTRACT

A latch for a pivotal door has a respective pair of bolts on each of two opposite edges of the doors. The bolts are independently movable between latching positions projecting from the respective door edge and freeing positions at least partially recessed in the respective door edge, respective rods having outer ends connected to the bolts and inner ends. Respective actuating elements each connected to two of the inner ends are independently operable to shift the respective bolts between the respective latching and freeing positions. Respective adjacent handles coupled to the actuating are both shiftable independently of each other in generally the same direction between an unactuated position with the respective element setting the respective bolts in the latching positions and an actuated position setting with the respective element setting the respective bolts in the freeing positions.

10 Claims, 6 Drawing Sheets

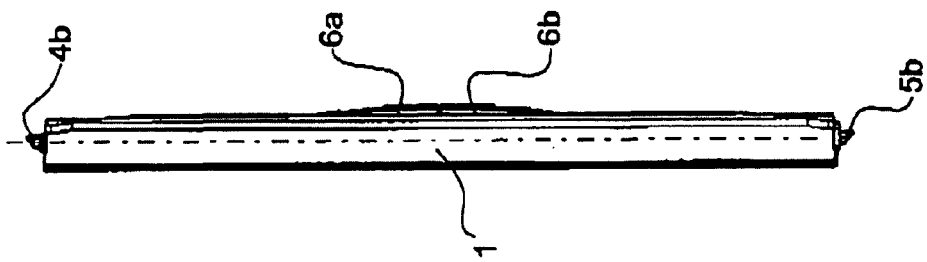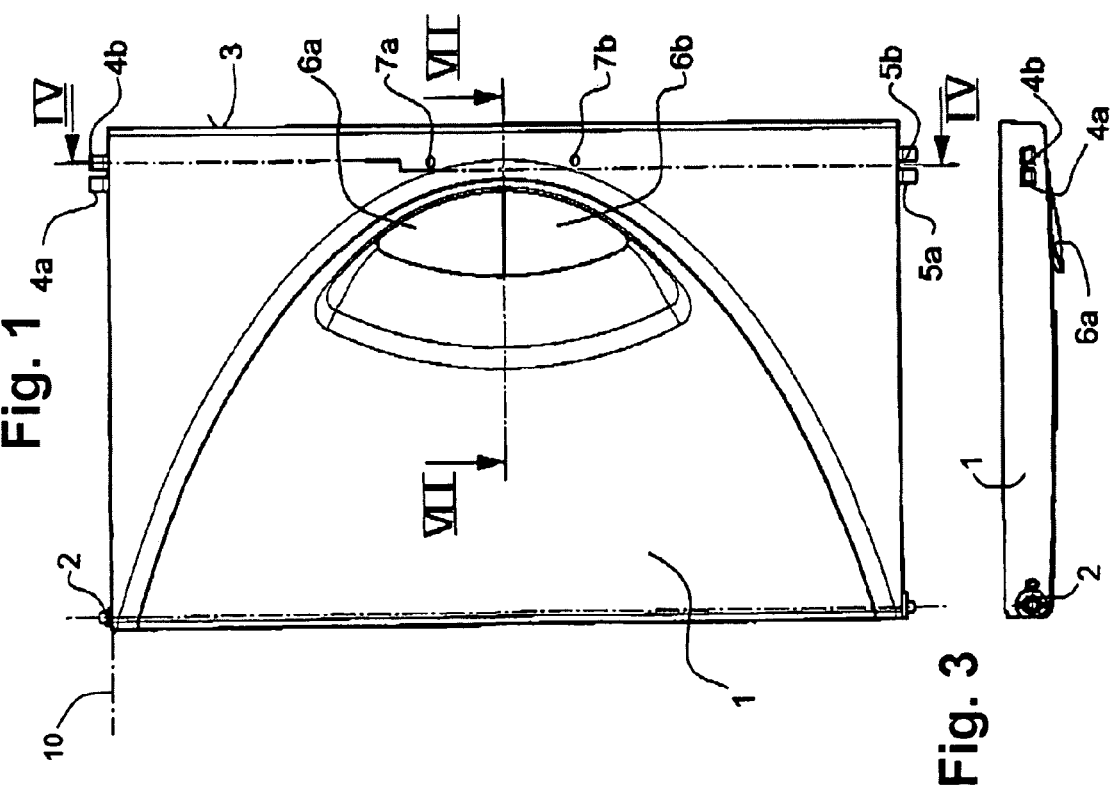

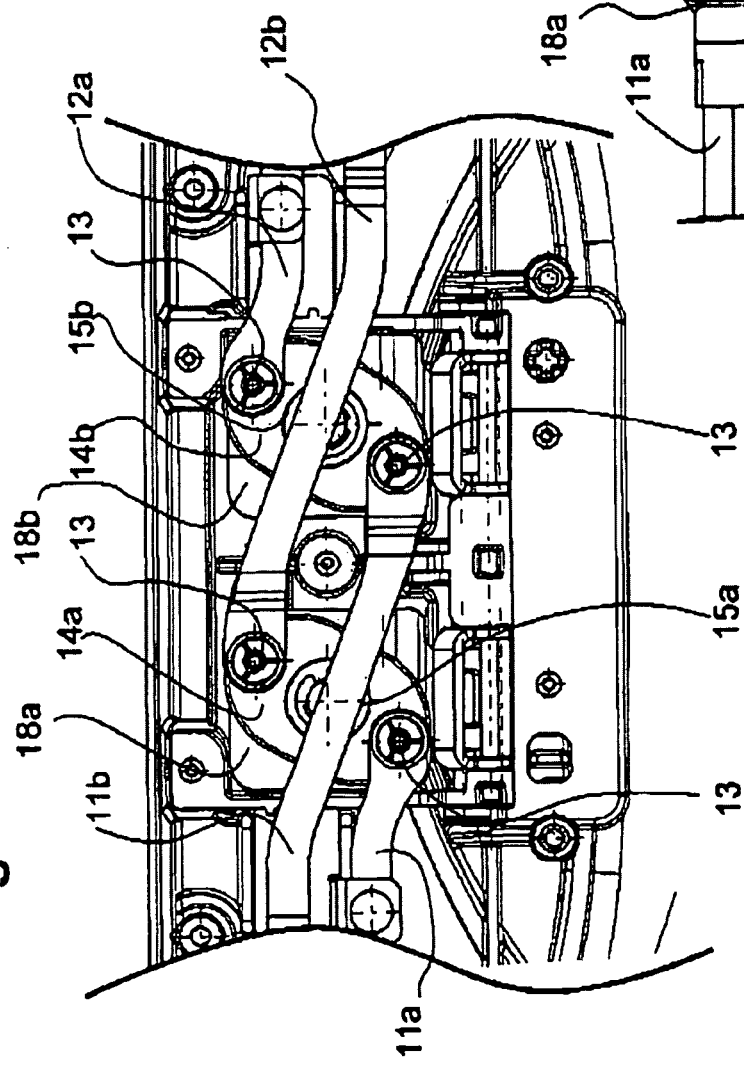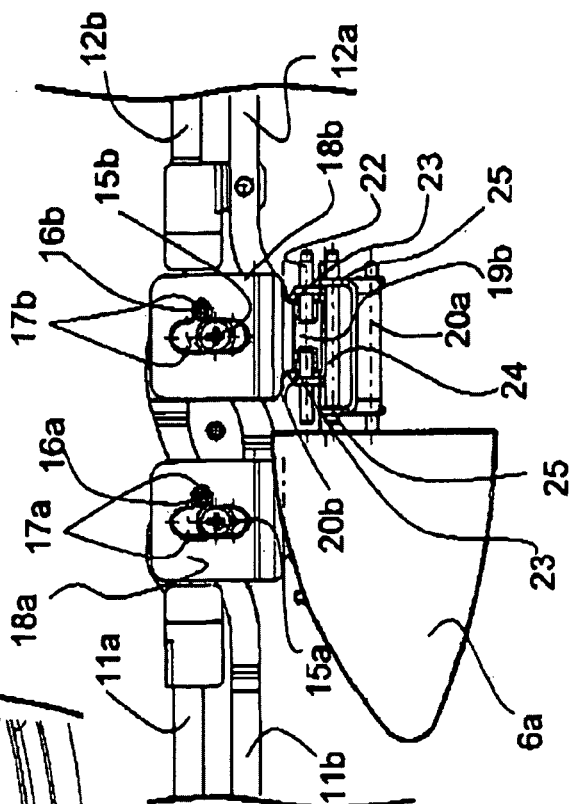

LATCH FOR AIRCRAFT OVEN

FIELD OF THE INVENTION

The present invention relates to a latch. More particularly this invention concerns a latch for a food-holding or -heating oven in an aircraft service kitchen.

BACKGROUND OF THE INVENTION

In ovens used airplanes to heat food and/or crisp baked goods such as rolls, baguettes, or the like, latches are known that have one upper and one lower latch bolt built into the door. In the known heating devices and ovens, which are subjected to particularly high demands during a flight, a turn-lock actuation is additionally moved into a locked position by manual actuation of a hand toggle, so as to be able to guarantee double security.

Because both latches function independently of one another and are also tested individually under static loads, it is necessary in the existing ovens with a toggle and/or turn-lock mechanism as the secondary latch for the door to be made quite rigid, which increases its weight. Hand movements in different directions, so-called biaxial movement, are necessary in order to close and fully latch the door or to unlatch or free it by rotating the turn-lock mechanism.

OBJECTS OF THE INVENTION

It is therefore an object of the present invention to provide an improved latch for an aircraft oven.

Another object is the provision of such an improved latch for an aircraft oven that overcomes the above-given disadvantages, in particular that allows for simple manipulation during latching and unlatching, offering even greater latching security and allowing a weight-optimal construction.

SUMMARY OF THE INVENTION

A latch for a pivotal door has according to the invention a respective pair of bolts on each of two opposite edges of the doors. The bolts are independently movable between latching positions projecting from the respective door edge and freeing positions at least partially recessed in the respective door edge, respective rods having outer ends connected to the bolts and inner ends. Respective actuating elements each connected to two of the inner ends are independently operable to shift the respective bolts between the respective latching and freeing positions. Respective adjacent handles coupled to the actuating are both shiftable independently of each other in generally the same direction between an unactuated position with the respective element setting the respective bolts in the latching positions and an actuated position setting with the respective element setting the respective bolts in the freeing positions.

Thus with this system it is possible for both latches to engage both above and below into the door frame, thereby guaranteeing a high degree of latching security. Due to their four-point engagement, doors with the double-rod latch according to the invention and its two latch bolts each above and below may be constructed less massively. Moreover, a more ergonomic handling becomes possible because the handles are operated in the same direction when unlatching and opening the door.

If, according to one feature of the invention, the handles, which may according to a preferred embodiment be embodied as button-like grip shells arranged directly adjacent to one another, the latching and unlatching of the door may be performed with one hand and one motion. The central arrangement and identical construction of the two handles makes the installation of the door independent of whether the door must be attached to the oven on the left side or on the right. In addition, only one door construction is necessary in either case because, if rotated, the door may be used in both types of ovens. Furthermore the same parts are used for the double safety latch according to the invention, even at different installation heights. The individual rods need only be shorter or longer, as needed.

Moreover, the security of the latch is further improved by virtue of the fact that visible latched or unlatched position indicators are provided on the front of the door according to the invention. In this manner, it is possible to get a visible indication that clearly shows whether the door is latched or unlatched, for example, by means of different color codes, such as green and red.

A preferred embodiment of the invention provides for the upper and lower double rods to be embodied with one first, shorter individual rod and one second, longer individual rod, of which one upper rod and one lower rod is linked to the upper actuating element and, similarly, the other upper rod and the other lower rod is linked to the lower actuating element. This way, if only one of the handles is actuated, the door will still be solidly held shut at the top and the bottom. If both handles are grasped at the same time, the normal case, both latches, that is all four bolts, will be operated with two stress points each above and below, i.e. four latch bolts engaging in the associated keepers at the same time.

In an advantageous further development of the actuating and deflection coupling, it is recommended according to the invention for each rotatable actuating plate to engage with an associated slide with a bearing pin and an entrainment pin, with the bearing pin being guided in respective perpendicular guide and with the slide being coupled with the handles via links in a movement-dependent manner. When the handles are operated, the slides are subjected to a straight-line movement and are deflected on the actuating plates, which may be pivoted in the clockwise and counterclockwise direction in the vertical door plane, for their rotation, whereupon the double rod assemblies are displaced. In the latched position, the handles are in a recessed position in the front of the door. In order to open, and therefore to unlatch, the door, the handles are pulled outward, whereupon they project slightly from the front of the door with their ends located at a distance from the coupling.

According to one embodiment of the invention, two links form part of a quasiparallelogrammatic linkage with a four-point bearing, with two of the bearing points being embodied as movable bearings. Actuation of the handles is thus converted into a functionally secure and positively driven manner to the straight-line movement of the slides and, from the slides, to the rotation of the actuating plates, with the movable bearings allow the handle to be lifted outward and to retract inward when opening and closing the door.

Here, according to the invention one link is narrower than the other link, and both links are forked at their bearing points with flat bars located at a distance from one another, with the slide being attached between the flat bars of the narrower link on a common axis providing the bearing points there by means of a coupling head, and with both links having a movable bearing on their ends facing the handle. This embodiment allows a compact, space-saving structure in the limited amount of space available in the interior of the door.

A further advantage of the invention provides for the slides to be provided on at least one of their outer surfaces extending in the sliding direction with two latch grooves located at a distance from one another, into which a latch formation of the handle housing may engage one after the other in a closed intermediate position and in the latched final position of the door. In this manner, the straight-line movement of the slides taking place on actuation of the handle is given definite latch points, one in an intermediate position in which, although the door has already been closed, i.e., the latch bolts have already been snapped into the keepers of the door frame with part of their length, and another in the latched final position in which the latch bolts have been set so that they extend completely into the keepers.

BRIEF DESCRIPTION OF THE DRAWING

The above and other objects, features, and advantages will become more readily apparent from the following description, reference being made to the accompanying drawing in which:

FIG. 1 is a front elevational view of an oven door with a latch according to the invention;

FIG. 2 is a side view of the door;

FIG. 3 is a top view of the door;

FIG. 9 is a large-scale view of the detail indicated at IX in FIG. 8;

FIG. 10 is a front view of the structure shown in FIG. 9, with the door's outer cover panel removed.

SPECIFIC DESCRIPTION

Figure 6:
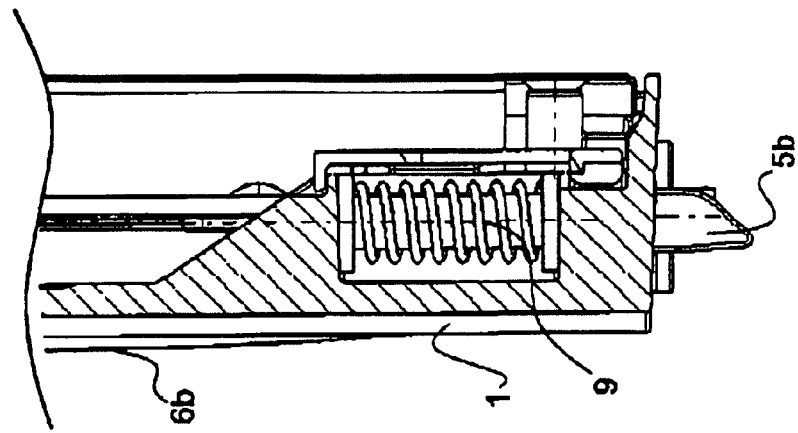
FIGS. 5 and 6 are large-scale views of the details indicated at V and VI in FIG. 4.

As seen in FIGS. 1 to 3 a door 1 of an oven of the type used in on-board aircraft service kitchens has on its left side a vertical pivot axis 2 around which it may be pivoted between open and closed positions in a frame illustrated schematically at 10. Its opposite free edge 3 carries a latch having in the interior of the door two upper locking bolts or heads 4a and 4b and two lower locking bolts or heads 5a and 5b arranged next to one another. The outer latch bolts 4b and 5b are actuated by an upper handle 6a embodied as a button-like grip shell and the inner heads 4a and 5a are operated by a similar lower handle 6b located directly thereunder. In the unlatched position of the door 1, the handles 6a and 6b project slightly from the front panel of the door with their free ends as shown in FIGS. 2 and 3. The latched or unlatched condition of the door 1 is made visibly obvious to operating personnel by unlatched position indicators 7a and 7b (cf. FIG. 1) on the front of the door 1.

Figure 5:
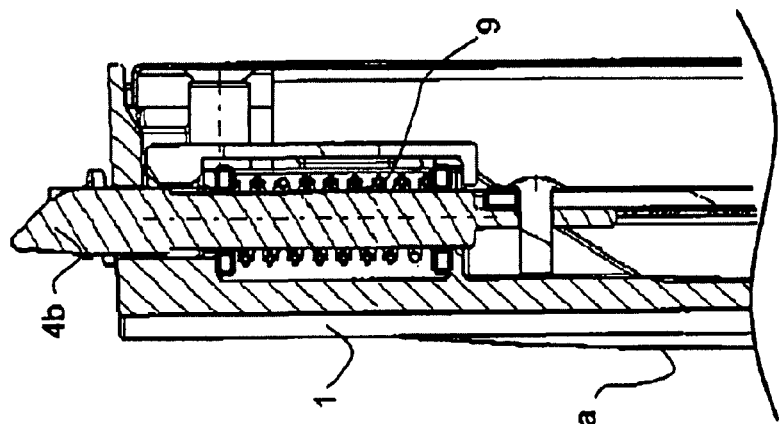
Figure 4:
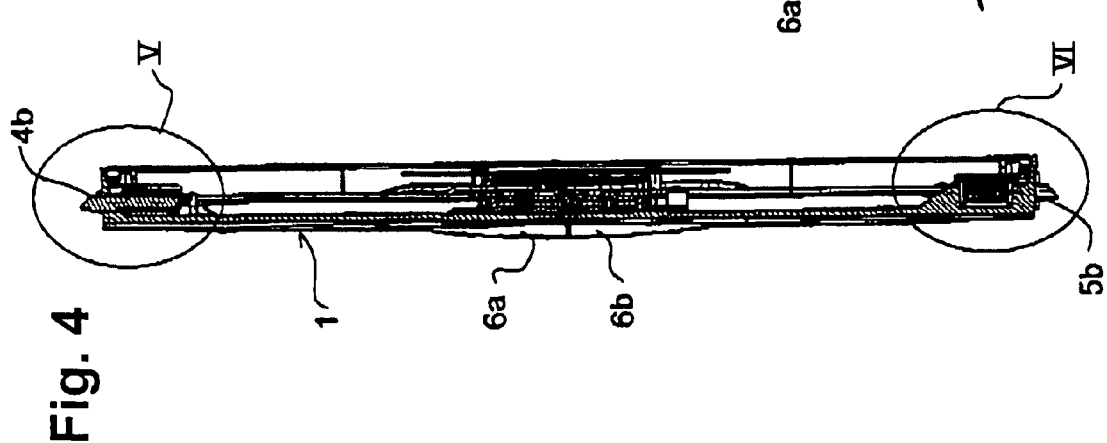
FIG. 4 is a vertical section taken along line IV-IV of FIG. 1.

Each latch bolt 4a, 4b, 5a, and 5b is part of or coupled to a respective rod 11a, 11b, 12a, and 12b that in turn are coupled to one of two centrally arranged actuating elements 14a and 14b in turn connected to the handles 6a and 6b. When the handles 6a and 6b are operated to unlatch the door 1, the latch bolts 4a, 4b, 5a, 5b are pulled out of the respective unillustrated keepers of the door frame 10 against the force of compression springs 9 (FIGS. 5 and 6).

Figure 8:
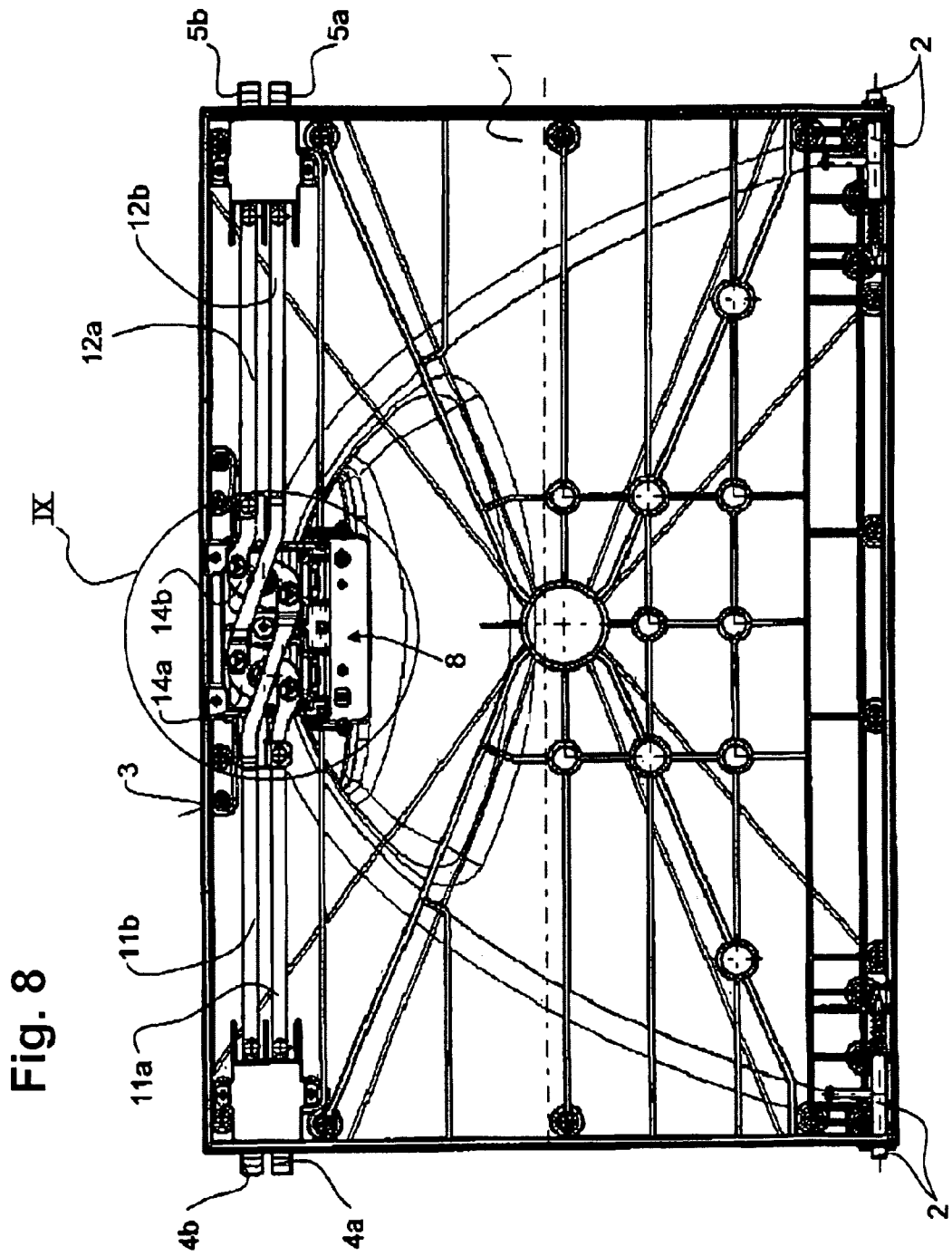
FIG. 8 is an rear elevational view of the door of FIG. 1 with its inner cover panel removed.

As shown in FIG. 8, the upper latch bolts 4a and 4b are mounted on the outer ends of the upper rods 11a and 11b and the lower locking bolts 5a and 5b on the lower ends of the lower rods 12a and 12b. The rods 11a and 12a are shorter than the respective rods 11b and 12b, and their inner ends are pivoted on shafts 13 of a rotatable upper actuating plate 14a and a rotatable lower actuating plate 14b (see also FIG. 9). The actuating plate 14a is connected to the rods 11a and 12b, and the actuating plate 14b is connected to the rods 12a and 11b. FIGS. 8 and 9 show the actuating plates 14a and 14b pivoted clockwise for latching the door 1. In order to open the door, the actuating plates 14a and 14b are pivoted counterclockwise such that, in the open position, the latch bolts 4a, 4b, 5a, and 5b no longer project from the upper and lower edges of the door 1. In the closed but as yet unlatched position of the door 1, the actuating plates 14a and 14b assume an approximately 12 o'clock position in which the latch bolts 4a, 4b, 5a, and 5b project only partially from the door 1.

Each rotatable actuating plate 14a and 14b is pivoted on a respective bearing pin 15a and 15b and carries offset therefrom a respective entrainment pin 16a and 16b (FIG. 10). The pins 16a and 16b engage with play in respective guide slots 17a and 17b of respective upper and lower slides 18a and 18b. When the handles 6a and 6b are operated, the slides 18a, 18b are shifted vertically, and this vertical movement is converted by interaction of the pins 16a and 16b and slots 17a and 17b to rotation of the actuating plates 14a and 14b with corresponding displacement of the rods 11a, 11b, 12a, and 12b.

Figure 7:
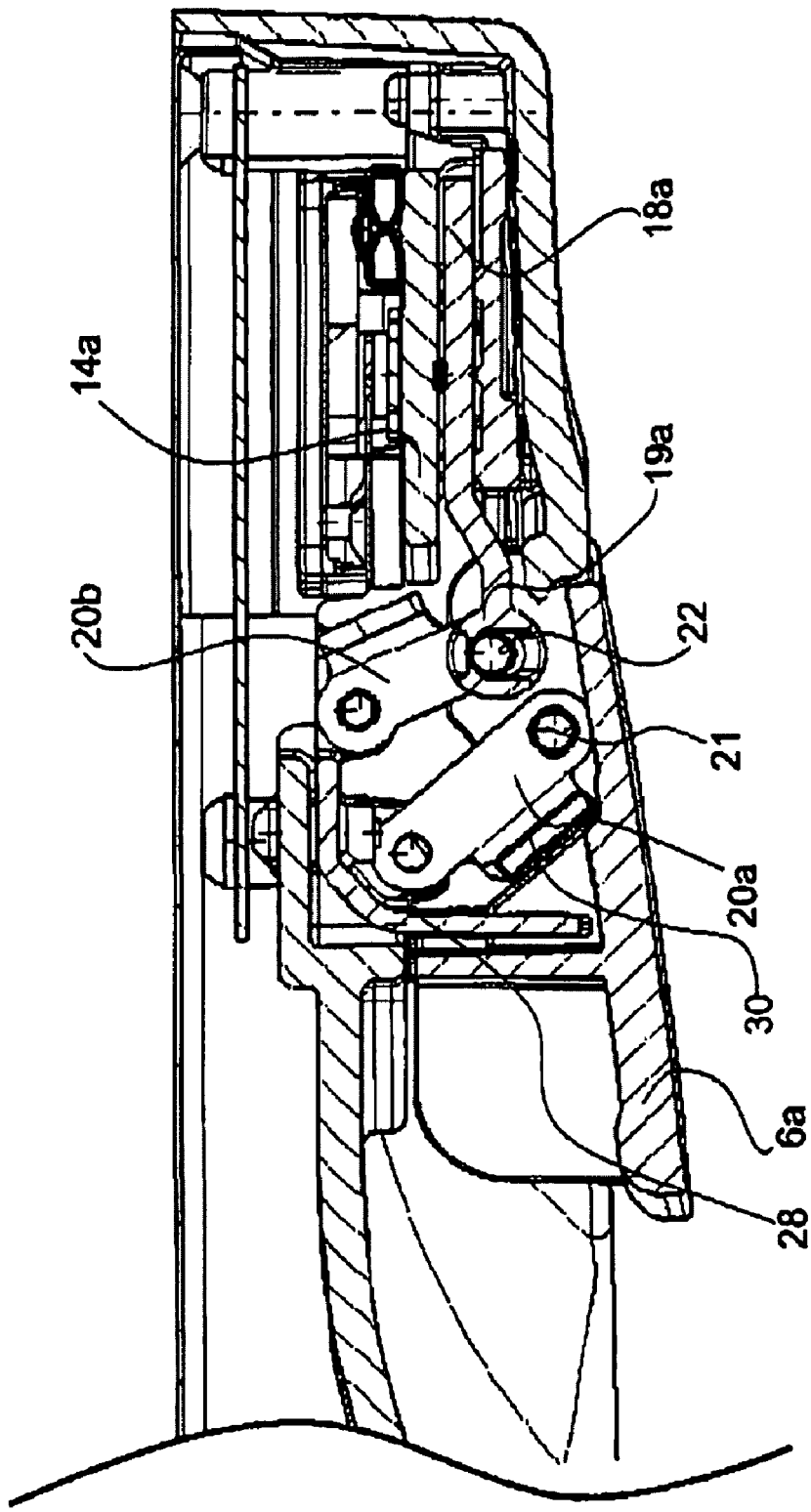
FIG. 7 is a large-scale horizontal section taken along line VII-VII of FIG. 1.

As shown by FIG. 7 with reference to the actuating mechanism for the upper handle 6a, the slides 18a and 18b are coupled to the respective handles 6a and 6b for joint movement therewith via respective coupling heads 19a and 19b (see also FIG. 10). Two links 20a and 20b form a rough parallelogrammatic linkage with four-point bearing. Pivots 21 and 22 are on the respective handle 6a or 6b and are movable therewith, with the head 19a shown secured at the pivot 22. The movable pivots 21 and 22 allow the parallelogrammatic linkage a degree of freedom upon actuation of the handles 6a and 6b with a positive driver 30 (see FIG. 7) in a handle housing 28. The outer edge of the grip shells 6a and 6b swing outward when opening the door 1 in order to prevent a collision with the door 1 and, when latching the door 1, move inward such that, in the open, unlatched position of the door 1, the front edges or ends of the handles 6a and 6b project somewhat from the front of the door 1. The coupling heads 19a and 19b of the slides 18a and 18b are pivoted at 22 on the link 20b that is provided with flat bars 23 spaced from one another. The link 20a, which is longer than the link 20b (see FIG. 10), has the other movable pivot 21 and forked end with flat bars on an axis 24.

Figure 11:
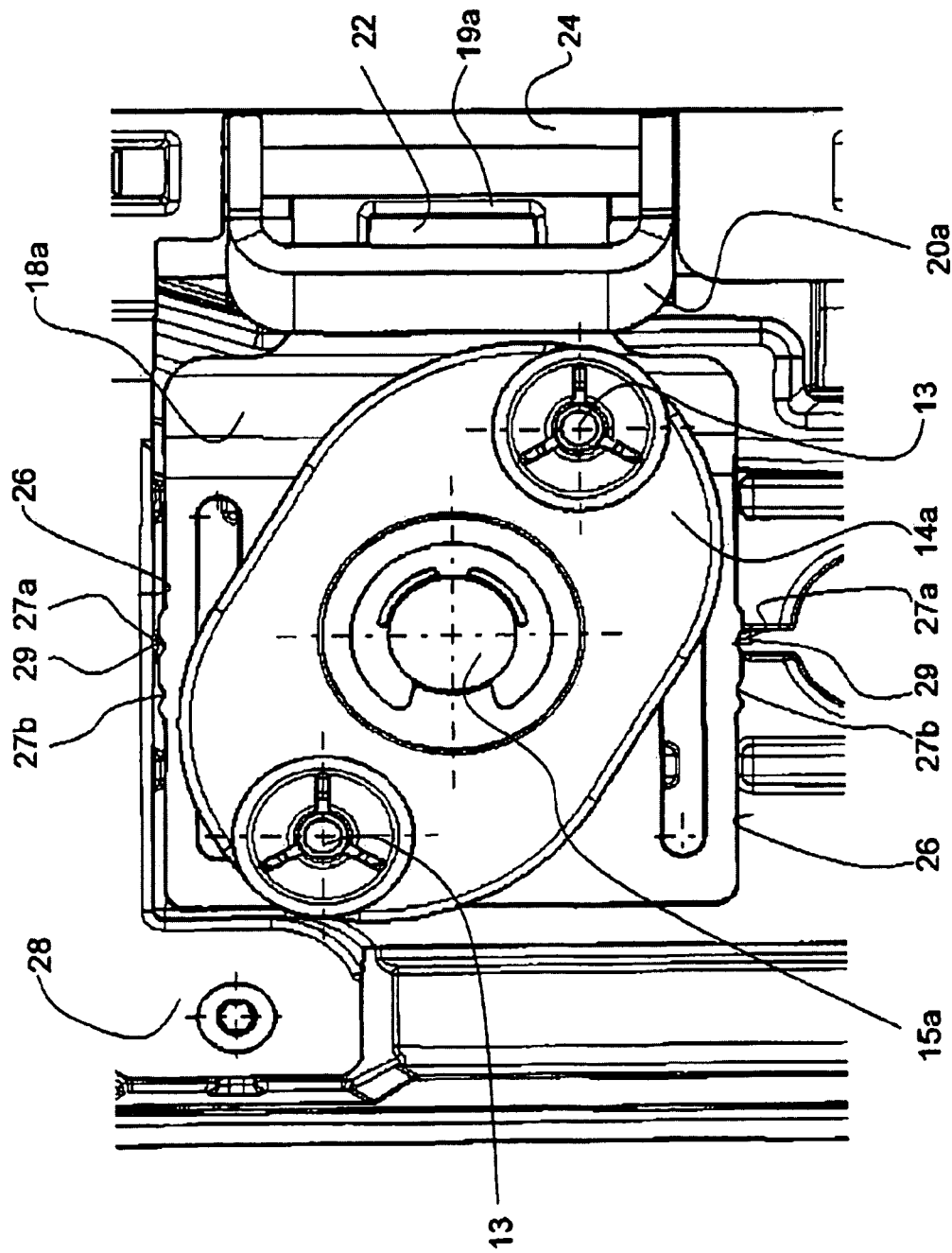
FIG. 11 is a large-scale view of a detail of the structure shown in FIG. 9.

As shown in FIG. 11 with reference to the rotatable actuating plate 14a, the slides 18a and 18b are formed with spaced latch grooves 27a and 27b on their horizontal upper and lower edges 26. These latch grooves 27a and 27b interact with respective latch protrusions 29 on the surrounding housing 28 of the handles 6a and 6b. If, upon actuation of the handles 6a and 6b, the latch protrusions 29 engage in the latch grooves 27b, this indicates the closed but initially only pre-latched position of the door 1. If the door handles 6a and 6b continue to be lifted, the latch protrusions 29 then engage in the latch grooves 27a so that the door 1 is in its final, latched position.

We claim:

1. A latch for a pivotal door having first and second opposite edges, the latch comprising:

respective pairs of first and second bolts on the first and second edges of the door, the bolts being independently movable between latching positions projecting from the respective door edges and freeing positions at least partially recessed in the respective door edges;

respective pairs of first and second rods extending substantially parallel to each other along respective parallel axes and substantially parallel to a plane of the door between the first and second door edges from which the respective bolts can project, each rod having an outer end connected to a respective one of the bolts and an inner end;

respective elements spaced axially from each other, one of the elements being connected to the inner end of one of the first rods and to the inner end of one of the second rods, the other of the elements being connected to the inner end of the other of the first rods and the inner end of the other of the second rods, the elements being independently operable to shift the respective bolts between the respective latching and freeing positions; and respective adjacent handles spaced axially immediately adjacent each other so they can be operated by one hand of a user, coupled to the elements, both of the handles being shiftable independently of each other by one hand in generally the same direction between an unactuated position with the respective element setting the respective bolts in the latching positions and an actuated position setting with the respective element setting the respective bolts in the freeing positions.

2. The latch defined in claim 1, further comprising means on an outside face of the door indicating whether the bolts are in the latched or freeing positions.

3. The latch defined in claim 1 wherein the two opposite edges are horizontal upper and lower edges and the rod axes extend vertically, the door further having two vertical edges bridging the horizontal edges, the rods, bolts, and elements being immediately adjacent one of the vertical edges and remote from the other of the vertical edges, the door having a vertical pivotal mounting at the other vertical edge.

4. The latch defined in claim 1 wherein the elements are plates pivotal about respective generally parallel axes fixed on the door, spaced apart relative to the rod axes, and extending generally perpendicular to the door plane.

5. A latch for a pivotal door having first and second opposite edges, the latch comprising:

respective pairs of first and second bolts on the first and second edges of the door, the bolts being independently movable between latching positions projecting from the respective door edges and freeing positions at least partially recessed in the respective door edges;

respective pair of first and second rods extending substantially parallel to each other and substantially parallel to a plane of the door between the door edges from which the respective bolts can project, the rods having outer ends connected to the respective bolts and inner ends;

respective actuating plates pivotal about respective generally parallel axes fixed on the door, spaced apart relative to the rod axes, and extending generally perpendicular to the door plane, one of the plates being connected to the inner end of one of the first rods and to the inner end of one of the second rods, the other of the plates being connected to the inner end of the other of the first rods and to the inner end of the other of the second rods, the plates being independently operable to shift the respective bolts between the respective latching and freeing positions;

respective adjacent handles spaced axially offset from each other and coupled to the actuating plates and both shiftable independently of each other in generally the same direction between an unactuated position with the respective plate setting the respective bolts in the latching positions and an actuated position setting with the respective plate setting the respective bolts in the freeing positions;

respective slides each movable only in a straight line generally perpendicular of the rod axes and radially of the plate pivot axes and each connected to a respective one of the handles; and interengaging entrainment formations on the slides and on the respective plates, whereby straight-line movement of the slides pivots the respective plates.

6. The latch defined in claim 5 wherein the handles are immediately adjacent each other so that they can both be shifted in the direction between the actuated and unactuated position by one hand.

7. The latch defined in claim 5 wherein the entrainment formations are respective pins on the plates offset from the respective plate pivot axis and engaging the respective slides.

8. The latch defined in claim 5, further comprising:

respective four-point generally parallelogrammatic linkages each having two generally parallel links each pivoted at one end on the door and at an opposite end on the respective handle.

9. The latch defined in claim 8 wherein one of the links of each of the linkages is longer than the other link of the respective linkage such that the respective handle moves from a position flush with the door in the latching positions of the respective bolts and a position projecting from the door and angled to the door in the freeing positions of the respective bolts.

10. The latch defined in claim 5, further comprising:

means for releasably retaining each of the slides in two positions, one of which corresponds to the latching positions of the respective bolts.

* * * * *